(12) United States Patent
Sakurai et al.

(10) Patent No.: US 7,903,219 B2
(45) Date of Patent: Mar. 8, 2011

(54) LIQUID CRYSTAL DISPLAY DEVICE

(75) Inventors: Toru Sakurai, Kounan (JP); Togo Morifuji, Tottori (JP); Yuji Yamamoto, Anpachi-cho (JP)

(73) Assignee: Sony Corporation, Tokyo (JP)

( * ) Notice: Subject to any disclaimer, the term of this patent is extended or adjusted under 35 U.S.C. 154(b) by 93 days.

(21) Appl. No.: 12/181,877

(22) Filed: Jul. 29, 2008

(65) Prior Publication Data

US 2009/0046230 A1   Feb. 19, 2009

(30) Foreign Application Priority Data

Aug. 16, 2007 (JP) ................. 2007-212435
Aug. 17, 2007 (JP) ................. 2007-212815

(51) Int. Cl.
*G02F 1/1333* (2006.01)
*G02F 1/01* (2006.01)

(52) U.S. Cl. .......... 349/138; 349/142
(58) Field of Classification Search .......... 349/138, 349/139
See application file for complete search history.

(56) References Cited

U.S. PATENT DOCUMENTS

| | | | | |
|---|---|---|---|---|
| 5,053,822 A | * | 10/1991 | Butler | 399/74 |
| 5,550,091 A | * | 8/1996 | Fukuda et al. | 204/192.23 |
| 5,959,763 A | * | 9/1999 | Bozler et al. | 359/290 |
| 6,646,050 B2 | * | 11/2003 | Ohrui et al. | 525/123 |
| 7,019,385 B1 | * | 3/2006 | Zhang et al. | 257/640 |
| 7,160,768 B2 | * | 1/2007 | Kudo et al. | 438/197 |
| 2001/0031835 A1 | * | 10/2001 | Ohrui et al. | 525/329.7 |
| 2004/0019170 A1 | * | 1/2004 | Ohrui et al. | 526/329.7 |
| 2004/0241920 A1 | * | 12/2004 | Hsiao et al. | 438/158 |
| 2005/0029593 A1 | * | 2/2005 | Kudo et al. | 257/347 |
| 2005/0148733 A1 | * | 7/2005 | Ohrui et al. | 525/244 |
| 2007/0070266 A1 | * | 3/2007 | Ochiai et al. | 349/106 |
| 2007/0206263 A1 | * | 9/2007 | Neuman et al. | 359/267 |
| 2008/0087960 A1 | * | 4/2008 | Hsiao et al. | 257/347 |
| 2008/0113118 A1 | * | 5/2008 | Hashimoto et al. | 428/1.6 |

FOREIGN PATENT DOCUMENTS

| | | | |
|---|---|---|---|
| JP | A-63-240584 | | 10/1988 |
| JP | A-02-091620 | | 3/1990 |
| JP | 02211672 A | * | 8/1990 |
| JP | A-2000-196100 | | 7/2000 |
| JP | A-2000-267128 | | 9/2000 |
| JP | A-2001-183685 | | 7/2001 |
| JP | A-2005-202288 | | 7/2005 |
| JP | A-2007-086657 | | 4/2007 |
| JP | A-2007-093859 | | 4/2007 |

* cited by examiner

*Primary Examiner* — K. Cyrus Kianni
(74) *Attorney, Agent, or Firm* — K&L Gates LLP (57) ABSTRACT

A liquid crystal display device includes a pair of substrates opposing each other, a liquid crystal layer disposed between the pair of substrates, and a pair of electrodes separated by an insulating layer, disposed on one of the substrates. The pair of electrodes drives the liquid crystal layer. The insulating layer has a compressive stress in the range of 0 to $5\times10^4$ N/cm².

11 Claims, 4 Drawing Sheets

LIQUID CRYSTAL DISPLAY DEVICE

BACKGROUND

1. Technical Field

The present invention relates to liquid crystal display devices, and particularly to a type including a pair of opposing substrates between which a liquid crystal layer is disposed, and a pair of electrodes separated by an insulating layer that are disposed on one of the substrates and drive the liquid crystal layer.

2. Related Art

Among liquid crystal display devices, a twisted nematic (TN) type is widely used. This type is limited in viewing angle in principle. Transverse electric field liquid crystal display devices are known as a type to eliminate the limitation. In the transverse electric field type, pixel electrodes and a common electrode are formed on the same substrate, and a voltage is applied between the pixel electrodes and the common electrode to generate an electric field substantially parallel to the surface of the substrate, thereby driving liquid crystal molecules in a plane substantially parallel to the surface of the substrate.

Transverse electric field liquid crystal display devices include an in-plane switching (IPS) type and a fringe field switching (FFS) type. In the IPS type, a comb-like pixel electrode and another comb-like common electrode are arranged in combination. In the FFS type, an upper electrode and a lower electrode are disposed with an insulating layer in between. One of the electrodes is used as a common electrode while the other is used as a pixel electrode, and apertures through which an electric field is transmitted, such as slits, are formed in the upper electrode.

Japanese Unexamined Patent Application Publication No. 2001-183685 discloses a structure of the insulating layer between the upper electrode and the lower electrode. In this structure, the pixel electrode and the common electrode are formed of ITO with an insulating layer in between. The insulating layer is defined by a TFT surface protection insulating layer or a TFT gate insulating layer.

A liquid crystal display device includes a storage capacitor to reduce the changes in pixel potential for driving the liquid crystal. In the FFS type, the capacitor defined by the overlap of the upper electrode and the lower electrode can be used as the storage capacitor, with the insulating layer disposed between the upper electrode and the lower electrode. For a smaller storage capacitor having a higher capacitance, the insulating layer between the upper electrode and the lower electrode requires increased properties.

For a FFS type liquid crystal device, transistors are formed on a glass substrate, and subsequently a planarizing layer is formed. Then, a lower electrode, an insulating layer, and an upper electrode are formed in that order. Since the insulating layer is formed among such many steps for forming layers, the adhesions between the insulating layer and the adjoining layers may be varied to cause the insulating layer to separate. Consequently, problems occur that the liquid crystal display device cannot display high-quality images. For example, the insulation between the upper electrode and the lower electrode may be reduced; the electric field for driving the liquid crystal layer may be disturbed; or the storage capacitor is seriously degraded in characteristics.

SUMMARY

Accordingly, an advantage of some aspects of the invention is that it provides a liquid crystal display device in which the adhesion of an insulating layer between an upper electrode and a lower electrode is enhanced to increase the quality of displayed images.

The invention is based on the findings that in an FFS type liquid crystal display device, the insulating layer formed between the upper electrode and the lower electrode establishes a specific relationship between the residual stress of the insulating layer and its adhesion to other layers. More specifically, if the insulating layer has a residual stress within a specific range, the adhesion can be kept at a substantially constant value. If the residual stress is increased beyond the range, the insulating layer separates. The following embodiments are based on the findings.

According to an aspect of the invention, a liquid crystal display device is provided which includes a pair of substrates opposing each other, a liquid crystal layer disposed between the pair of substrates, and a pair of electrodes separated by an insulating layer and disposed on one of the substrates. The pair of electrodes drives the liquid crystal layer. The insulating layer has a compressive stress in the range of 0 to $5 \times 10^4$ $N/cm^2$. According to experiments, the insulating layer having a compressive stress in this range is not separated from other layers or films. Such an insulating layer leads to a liquid crystal display device that can display high-quality images.

Preferably, the insulating layer and the pair of electrodes define a storage capacitor. In this instance, the storage capacitor can be designed more freely than a storage capacitor using, for example, the gate of a pixel TFT.

Preferably, the insulating layer is made of an inorganic insulating material. Preferably, the insulating layer includes at least one layer selected from the group consisting of a silicon nitride layer, a silicon oxide layer, and a silicon oxynitride layer. Since an inorganic insulating layer generally has a higher dielectric constant than an organic insulating layer, the inorganic insulating layer leads to superior capacitance properties.

Preferably, the liquid crystal display device further includes a transistor on the substrate on which the pair of electrodes is disposed, and a planarizing layer disposed over the transistor. The electrodes separated by the insulating layer are disposed on the planarizing layer. Even though the insulating layer is formed on the planarizing layer, the insulating layer having a compressive stress in the above range does not separate, and the resulting liquid crystal display device can display high-quality images.

Preferably, one of the electrodes acts as a pixel electrode and the other acts as a common electrode. Preferably, at least one of the electrodes is made of a transparent electroconductive film. Preferably, one of the electrodes is disposed closer to the liquid crystal layer than the other and has apertures.

The inorganic insulating material used for the insulating layer may have a refractive index in the range of 1.46 to 2.00 and a dielectric constant in the range of 4 to 7. Such an insulating layer ensures sufficient properties for a storage capacitor and leads to a liquid crystal display device that can display high-quality images.

The liquid crystal display device further including a transistor and a planarizing layer in that order on the substrate on which the pair of electrodes are disposed, the electrodes separated by the insulating layer may be disposed on the planarizing layer, and one of the electrodes is made of a transparent electroconductive film and the other is disposed closer to the liquid crystal layer and has apertures. The insulating layer is formed under conditions that the planarizing layer and the electrode made of the transparent electroconductive film are not degraded. Thus, layers underlying the insulating layer used for the storage capacitor can be prevented from being affected by the step of forming the insulating layer. For example, even though one of the electrodes is made of a transparent electroconductive film, the transparency and electroconductivity can be hardly degraded. In addition, the insulating layer can lead to superior capacitance properties.

The insulating layer may be made of an inorganic insulating material, and the planarizing layer may be made of an organic insulating material. In general, an organic insulating material forms a more even layer than an inorganic insulating material. Accordingly, an organic planarizing layer can reduce unevenness and steps formed by the underlying layers. Since an inorganic insulating material generally has a higher dielectric constant than an organic insulating material, an inorganic insulating layer can lead to superior capacitance properties.

In this structure, the insulating layer preferably has a refractive index in the range of 1.46 to 2.00 and a dielectric constant in the range of 4 to 7. Such an insulating layer ensures sufficient properties for a storage capacitor and leads to a liquid crystal display device that can display high-quality images.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will now be described with reference to the drawings. While the following embodiments will describe FFS liquid crystal display devices that display images using three colors: red (R), green (G), and blue (B), more colors may be used including, for example, cyan (C), or monochrome images may be displayed. The shapes, structures, materials, and others described below are no more than examples, and may be modified according to the application of the liquid crystal display device. The FFS liquid crystal display devices described in the following embodiments ate of transverse electric field type whose upper electrode has slits as apertures through which an electric field is transmitted. However, the aperture may be in a comb-like shape or fence-like shape. The liquid crystal display device may not be of FFS type, but IPS type. The slits used herein refer to apertures whose ends are closed, and each slit is separated from each other without connecting to each other. The comb-like or fence-like shape refers to apertures connected to each other.

Figure 1:
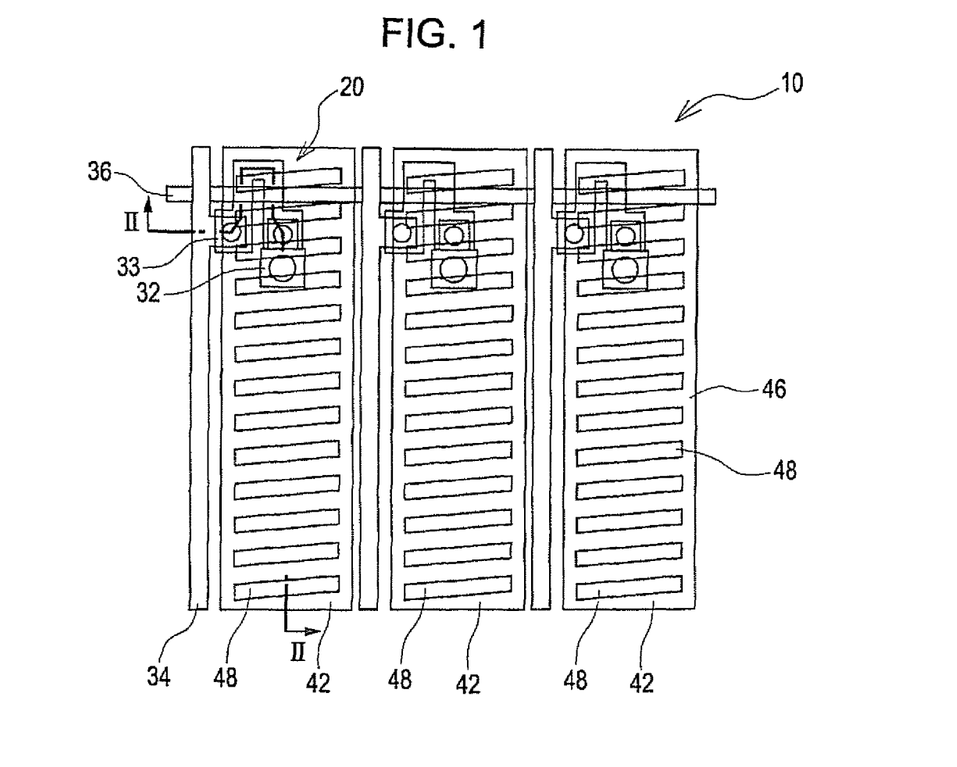
FIG. 1 is a plan view of pixels on an element substrate of a liquid crystal display device according to an embodiment of the invention.

FIG. 1 is a plan view of pixels on the element substrate 10 of a liquid crystal display device according to an embodiment of the invention. The liquid crystal display device includes a pair of substrates between which a liquid crystal layer is disposed. The liquid crystal layer is driven by a pair of electrodes, and thus the liquid crystal display device displays images. In order to drive a plurality of pixels, a transistor is provided for each pixel. The substrates may be distinguished from each other by whether transistors are disposed. The substrate on which transistors are disposed may be referred to as an element substrate 10, and the other substrate, opposing the element substrate 10, may be referred to as an opposing substrate. For color images, a set of R, G, B three color pixels defines a picture element, and transistors are provided to the respective pixels.

Figure 2:
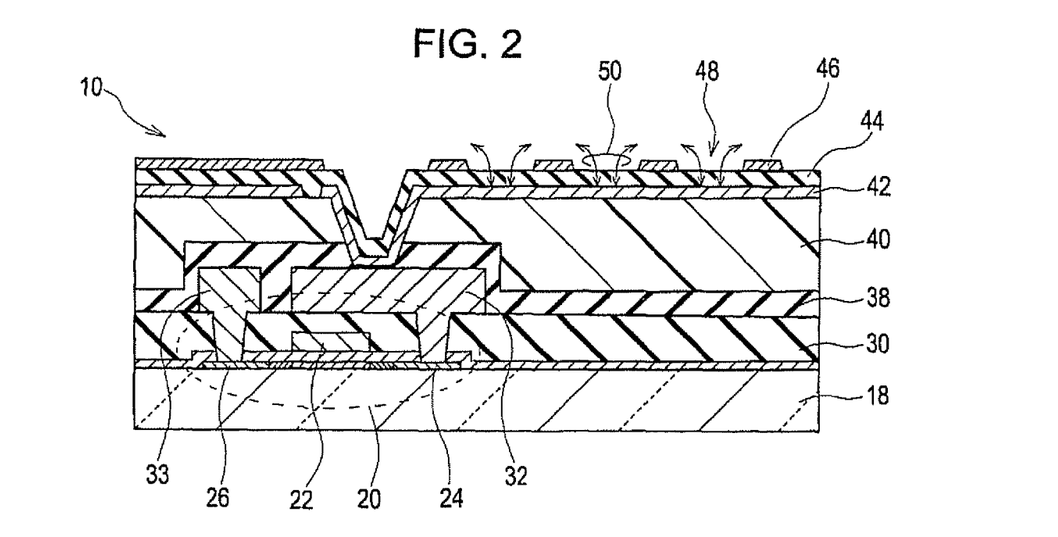
FIG. 2 is a sectional view taken along line II-II in FIG. 1.

FIG. 1 specifically shows the structure in plan view of a picture element, that is, three pixels, in the display region for images formed by R, G, and B three colors on the element substrate 10 of an FFS active matrix liquid crystal display device. FIG. 2 is a sectional view taken along line II-II in FIG. 1, in which the thicknesses of parts are enlarged.

On the element substrate 10 of the liquid crystal display device, as shown in FIG. 1, a plurality of drain lines 34 extend in a straight line (in a vertical direction in FIG. 1), and a plurality of gate lines 36 extend in the direction intersecting with the drain lines 34 (in the direction perpendicular to the drain lines 34 in the embodiment, in the transverse direction in FIG. 1). The drain lines 34 act as signal lines to which image data signals are transmitted from a control circuit (not shown) of the liquid crystal display device. Therefore, the drain lines 34 may be called data lines or simply signal lines. The gate lines 36 act as signal lines to which scanning signals for selecting transistors provided for each pixel. Therefore the gate lines may be called scanning lines.

Each pixel is disposed in regions (pixel regions) divided by the drain lines 34 and the gate lines 36. FIG. 1 shows R, G, and B three color pixels defining a picture element. Since the common electrode 46 is formed over the entire surface of the element substrate 10 or in such a manner as to cover a plurality of pixels, FIG. 1 does not show the contour of the common electrode 46 except the lines of slits 48.

A pixel TFT 20 is disposed in each pixel region surrounded by the drain lines 34 and the gate lines 36. In FIG. 1, the pixel TFT 20 is defined by a substantially U-shaped semiconductor layer (substantially inverted U-shape in FIG. 1). The gate line 36 extends across the two arms of the U-shape in the direction perpendicular to the drain line 34. In this structure, the source electrode 32 of the pixel TFT 20 and its drain electrode 33 connected to the drain line 34 are disposed at the same side with respect to the gate line 36. Consequently, in the pixel TFT 20, the gate line 36 intersects the semiconductor layer twice between the source and the drain. This is equivalent to a structure having two gate electrodes between the source and the drain of a semiconductor layer.

Thus, the drain of the pixel TFT 20 is connected to the corresponding drain line 34 through the drain electrode 33. The source is connected to the pixel electrode 42 through the source electrode 32. The pixel electrode 42 is disposed in a planar form for each pixel, and connected to the source of the corresponding pixel TFT 20. FIG. 1 shows rectangular pixel electrodes 42.

The common electrode 46 is disposed over the element substrate 10. Alternatively, the common electrode 46 may be disposed for each pixel in some cases. In this instance, common electrode liens are formed to connect the common electrodes. The common electrode 46 is defined by a transparent electroconductive layer in which slits 48 (apertures) are formed. When a voltage is applied between the pixel electrode 42 and the common electrode 46, an electric field 50

(see FIG. 2) is transmitted through the slits 48 to generate a transverse electric field parallel to the surface of the substrate.

An alignment layer (not shown) is disposed on the common electrode 46 and subjected to rubbing for orientation. The rubbing may be performed in the direction, for example, parallel to the gate lines 36 in FIG. 1. The slits 48 of the common electrode 46 extend in a direction slightly slanted with respect to the rubbing direction. For example, the slits 48 may be formed at an angle of about 5° with the rubbing direction. By forming the alignment layer on the common electrode 46 and subsequently subjecting the alignment layer to rubbing, the element substrate 10 is completed.

Turning now to FIG. 2, the structure of the element substrate 10 of the FFS liquid crystal display device will be described. FIG. 2 is a sectional view taken along line II-II in FIG. 1, showing one of the pixels.

The element substrate 10 includes an optically transparent base 18, the pixel TFT's 20 disposed on the optically transparent base 18 with an appropriate buffer layer in between, an insulating interlayer 30, source electrodes 32, drain electrodes 33, a passivation layer (PV layer) 38, a planarizing layer 40, the pixel electrodes 42, an FFS insulating layer 44, and the common electrode 46.

Figure 3:
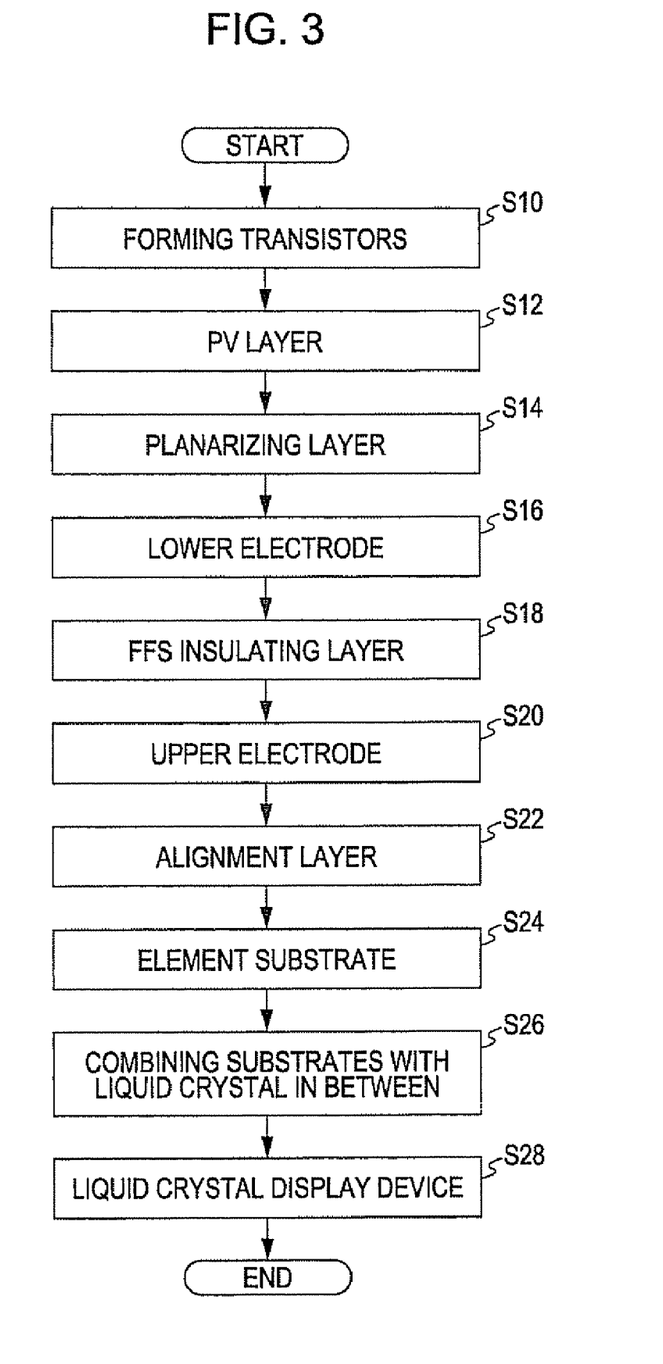
FIG. 3 is a flow diagram of a process for manufacturing a liquid crystal display device according to the embodiment of the invention.

FIG. 3 is a flow diagram of the process for manufacturing the liquid crystal display device including a detailed procedure for preparing the element substrate 10. The process will be described using the reference numerals in FIGS. 1 and 2. First, the optically transparent base 18 is prepared, and the pixel TFT's 20 (transistors) are formed on the optically transparent base 18 (S10).

The optically transparent base 18 is made of, for example, a glass plate. The pixel TFT's 20 are arranged on the optically transparent base 18 with an appropriate buffer layer in between. In the present embodiment, each pixel TFT 20 includes a semiconductor layer formed of polysilicon at a low temperature, a gate insulating layer, and a gate electrode 22 in that order from below. The gate insulating layer is made of, for example, silicon oxide ($SiO_x$) or silicon nitride ($SiN_x$) and is disposed on the optically transparent base 18 to cover the semiconductor layer. The gate electrode 22 is made of a metal, such as Mo or Al, and disposed on the gate insulating layer so as to oppose the semiconductor layer. The gate electrode 22 is positioned over the semiconductor layer on the element substrate 10.

After forming the pixel TFT 20, the insulating interlayer 30 is formed of, for example, silicon oxide or silicon nitride so as to cover the gate electrode 22.

Then, the insulating interlayer 30 is provided with contact holes for the source 24 and the drain 26. The source electrode 32 and the drain electrode 33 are drawn out through the contact holes. The drain electrode 33 is formed of a metal, such as Mo, Al, or Ti, on the insulating interlayer 30 and connected to the drain 26 of the pixel TFT 20 through the contact hole for the drain. The drain electrode 33 is extended so as to serve as the drain line 34. The source electrode 32 is formed of, for example, the same material as the drain electrode 33 on the insulating interlayer 30 so as to be connected to the source 24 of the pixel TFT 20 through the other contact hole, or the contact hole for the source. The source electrode 32 will be connected to the pixel electrode 42, which is made of a transparent electroconductive film, as will be described below.

In the present embodiment, the junction of the drain electrode 33 and the drain line 34 acting as the data line is defined as the drain of the pixel TFT 20, and the junction of the source electrode 32 and the pixel electrode 42 is defined as the source of the pixel TFT 20. Since the drain and source of a pixel TFT 20 are compatible, however, the source may be connected to the data line and the drain may be connected to the pixel electrode 42.

The process up to the step of drawing out the source electrode 32 and the drain electrode 33 is referred to as a pixel TFT forming step (S10) as a whole. Subsequently, a passivation (PV) layer 38 is formed (S12). The PV layer 38 is an insulating layer protecting the entire pixel TFT 20, including the source electrode 32 and the drain electrode 33, from the external environment. The PV layer 38 may be formed of, for example, silicon oxide or silicon nitride like the insulating interlayer 30, or may be formed of a different material from the insulating interlayer 30.

Then, the planarizing layer 40 is formed (S14). The planarizing layer 40 is formed on the PV layer 38 so as to cover the drain electrode 33 and drain line 34 and the source electrode 32, thus planarizing the unevenness formed by the preceding steps for forming layers, contact holes, and other parts.

The planarizing layer 40 can be formed of a transparent organic insulating material, such as acrylic resin, or an inorganic insulating material, such as silicon nitride ($SiN_x$), silicon oxide ($SiO_x$), or silicon oxynitride ($SiO_xN_y$). Preferably, the planarizing layer 40 is formed of heat-resistant, reaction-resistant insulating material in consideration of the FFS insulating layer 44 that will be formed on the planarizing layer. Accordingly, preferred materials are inorganic insulating materials, such as silicon nitride, silicon oxide, and silicon oxynitride. If a transparent organic insulating material, such as acrylic resin, is used, the steps subsequent to the formation of the planarizing layer are preferably performed at a low temperature to prevent the deterioration of the planarizing layer 40. For example, the step subsequent to the formation of the planarizing layer is preferably performed at a temperature in the range of about 150 to 300° C.

After the formation of the planarizing layer, the pixel electrode 42 (lower electrode) is formed (S16). Specifically, a contact hole is formed in the PV layer 38 an the planarizing layer 40, and then an transparent electroconductive film is formed of indium tin oxide (ITO) or indium zinc oxide over the entire surface of the substrate. The transparent electroconductive film is patterned into the pixel electrodes 42. Thus, the source electrode 32 and the pixel electrode 42 are electrically connected to each other through the contact hole.

After the formation of the pixel electrode 42, the FFS insulating layer 44 is formed over the entire surface of the substrate (S18). The FFS insulating layer 44 is intended to isolate the lower electrode, or the pixel electrode 42, from the subsequently formed upper electrode, or the common electrode 46, and besides to form storage capacitors in the respective pixels of the FFS liquid crystal display device.

The FFS insulating layer 44 is preferably formed of a material having a high dielectric constant in consideration of use for the storage capacitor. Accordingly, an inorganic insulating material is used rather than an organic insulating material, and preferably, the FFS insulating layer includes at least one of a silicon nitride film, a silicon oxide film, and a silicon oxynitride film.

Since the planarizing layer 40 and the pixel electrode 42 have been formed before forming the FFS insulating layer 44, the conditions for forming the FFS insulating layer 44 are set from the viewpoint of adhesion with these films. More specifically, the adhesion between the FFS insulating layer 44 and other layers or films is varied depending on the surface states of the planarizing layer 40 and the pixel electrode 42, treatment conditions changing their surface states after forming the planarizing layer and before forming the FFS insulating layer, and the conditions for forming the FFS insulating layer 44. Hence, the FFS insulating layer 44 is formed under conditions that can establish stable adhesion.

Figure 4:
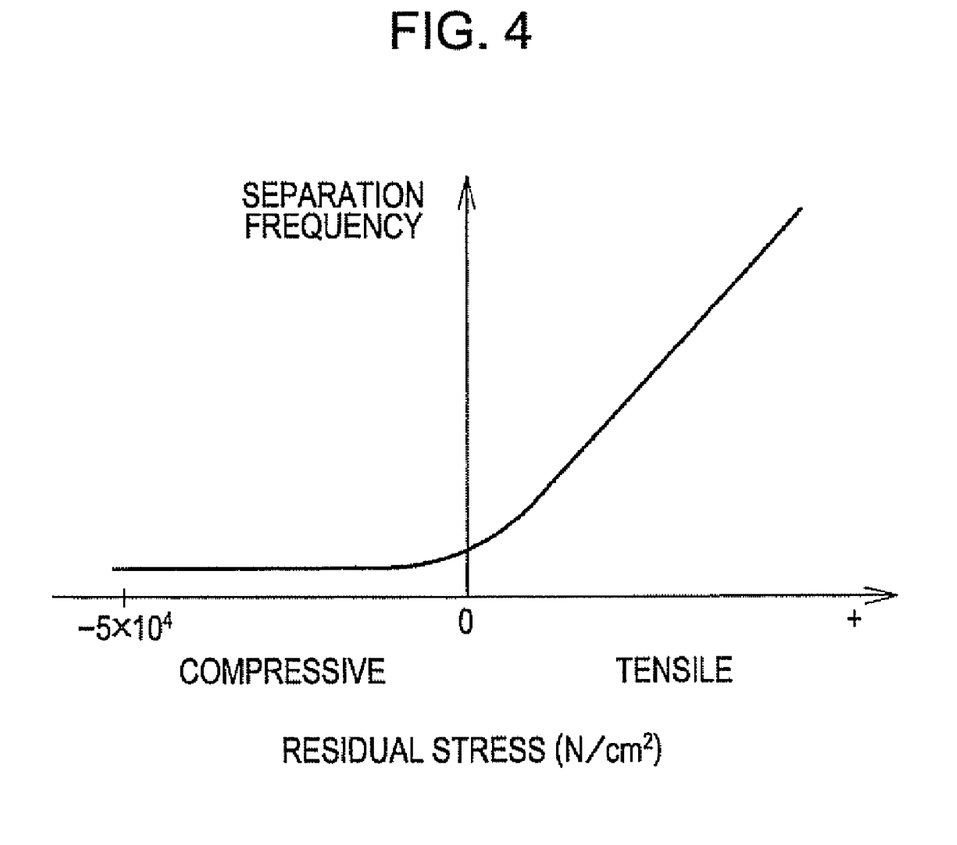
FIG. 4 is a graph showing the relationship between the residual stress of an FFS insulating layer and its separation frequency.

FIG. 4 shows the relationship between the residual stress of the FFS insulating layer and its separation frequency obtained from experiments. The relationship will be described with reference to FIGS. 1 to 3.

The residual stress of the FFS insulating layer 44 can be obtained from the warp of a glass plate on which an FFS insulating layer 44 is formed. For example, the warp of the element substrate 10 is measured in an intermediate step in the process for forming the structure as shown in FIG. 2, after Step S16 shown in FIG. 3 has been completed. Then, an FFS insulating layer 44 is formed in Step S18, and the warp of the element substrate 10 is measure at this time. The change in warp resulting from the formation of the FFS insulating layer 44 is calculated from the results of the measurements. The change in warp can be determined as the residual stress of the FFS insulating layer 44.

The separation frequency of the FFS insulating layer 44 can be determined by observing the degree of the separation of the FFS insulating layer 44 from other layers or films as the number of positions of the separation or the area of the separation in an intermediate step after the formation of the FFS insulating layer 44 in the process for preparing the element substrate 10. For example, the positions from which the FFS insulating layer 44 is separated are counted in an intermediate step for preparing a single element substrate 10 and the result can be defined as the relative separation frequency. The observation for separation frequency is preferably performed on an object on which the FFS insulating layer 44 has been formed. In order to accelerate the test, a specific test condition may be added. For example, a cleaning step cleaning the liquid crystal display device may be performed as a test condition. By measuring the separation frequency under such accelerating conditions, the separation frequency can easily be evaluated, and besides, the separation of the insulating layer 44 that may occur in subsequent steps can be evaluated. For example, the separation frequency may be measured after ultrasonic cleaning performed under specific conditions.

In FIG. 4, the horizontal axis represents the residual stress of the FFS insulating layer 44 and the vertical axis represents the separation frequency. As shown in FIG. 4, when the residual stress acts as a compressive stress and is in the range of 0 to $5 \times 10^4$ N/cm$^2$, the FFS insulating layer 44 hardly separates; when the residual stress acts as a tensile stress, the separation frequency increases according to the tensile stress.

According to the observation, the FFS insulating layer 44 more often separates from the interface with the planarizing layer 40 than that with the lower electrode or the pixel electrode 42. The FFS insulating layer 44 is in contact with several types of layers or films, and it is important that the relationship between the residual stress and the separation frequency is comprehensively evaluated according to the adhesion between the FFS insulating layer 44 and other layers or films.

FIG. 4 shows that the adhesion between the FFS insulating layer 44 and other layers or films can be increased by setting the residual stress as a compressive stress in the range of 0 to $5 \times 10^4$ N/cm$^2$, thereby increasing the quality of images that the liquid crystal display device displays. The residual stress can be controlled by appropriately selecting the conditions for forming the FFS insulating layer 44. For example, the rate of forming the FFS insulating layer may be controlled so that the FFS insulating layer has a residual stress in a predetermined range. Alternatively, the heating rate or cooling rate in the formation of the FFS insulating layer may be controlled so that the FFS insulating layer has a residual stress in a predetermined range. In view of the residual stress of the element substrate 10 in an intermediate step before forming the FFS insulating layer 44, the conditions for forming the FFS insulating layer 44 may be selected so that the resulting FFS insulating layer 44 has a residual stress in a predetermined range.

In addition, since the planarizing layer 40 and the pixel electrode 42 have been formed before forming the FFS insulating layer 44, the FFS insulating layer 44 is formed under the conditions that do not degrade the planarizing layer 40 or the pixel electrode 42.

The planarizing layer 40 is made of an transparent organic insulating material, such as acrylic resin, or an inorganic, insulating material, such as silicon nitride, silicon oxide, or silicon oxynitride. A planarizing layer 40 made of an inorganic insulating material is hardly affected by the conditions for forming the FFS insulating layer 44. In contrast, a planarizing layer 40 made of a transparent organic insulating material may react with an oxidizing gas to be degraded depending on the temperature for forming the FFS insulating layer 44. For example, the transmittance of the planarizing layer 40 may be reduced to 90% or less, and consequently, the quality of displayed images may be degraded. Therefore, the FFS insulating layer 44 is preferably formed at a temperature at which the planarizing layer 40 is not degraded. The formation of the FFS insulating layer 44 is more preferably started under conditions that the oxidizing gas has been reduced to the extent that the surface state of the planarizing layer 40 is not degraded.

The pixel electrode 42 is made of a transparent electroconductive film, and indium tin oxide (ITO) or indium zinc oxide (IZO) is used for the transparent electroconductive film, as described above. The transparency and electroconductivity of such a transparent electroconductive film are degraded under a reducing atmosphere. For example, the transmittancy of the transparent electroconductive film may be reduced to 70% or less and its resistivity may be increased to $10^3$ Ωcm or more. Consequently, the quality of displayed images is degraded. It is therefore preferable that the FFS insulating layer 44 be formed under conditions not containing a reducing gas (for example, hydrogen). If the FFS insulating layer is made of an inorganic insulating material, such as silicon nitride, silicon oxide, or silicon oxynitride, however, a gas containing hydrogen, such as monosilane (SiH$_4$), may be used as the material gas, or a hydrogen-containing gas such as ammonia (NH$_3$) is often contained in the carrier gas for reaction even if monosilane is not used. In such a case, where a reducing gas is inevitably used, the FFS insulating layer 44 is preferably formed at a temperature at which the pixel electrode 42 is not degraded by a reduction reaction. More preferably, the reducing gas is reduced to the extent that the transparency and the electroconductivity of the transparent electroconductive film are not degraded.

It is preferable that the FFS insulating layer 44 be formed under conditions that do not degrade the planarizing layer 40 and the pixel electrodes 42. In practice, the FFS insulating layer forming step (S18) is performed at a temperature in the range of about 150 to 300° C. In this temperature range, the characteristics of the planarizing layer 40 are hardly changed even if an oxidizing gas is used for forming the FFS insulating layer. Also, the pixel electrode 42 is hardly reduced even if a reducing gas is used for forming the FFS insulating layer, and the transparency of the pixel electrode is not degraded. In addition, the resulting insulating layer has appropriate characteristics for a capacitor.

The FFS insulating layer 44 can be formed of an inorganic insulating material. Accordingly, the insulating layer can exhibit a refractive index in the range of 1.46 to 2.00 and a dielectric constant in the range of 4 to 7. By setting the properties of the FFS insulating layer in those ranges and appropriately setting the thickness of the FFS insulating layer 44, the storage capacitance can be appropriately set according to the specifications of the liquid crystal display device.

Turning back to FIG. 3, the common electrode 46 (upper electrode) is formed after the formation of the FFS insulating layer 44 (S20). More specifically, a transparent electroconductive film is formed of indium tin oxide (ITO) or indium zinc oxide (IZO) over the entire surface of the FFS insulating layer 44. The resulting transparent electroconductive film is patterned into a common electrode 46 having a plurality of slits 48. A common electrode potential is supplied to the common electrode 46 through a common electrode line (not shown).

The slits 48 are apertures through which an electric field 50 for driving the liquid crystal layer between the pixel electrode 42 (lower electrode) and the common electrode 46 (upper electrode) is transmitted. As shown in FIG. 1, the slits 48 are closed narrow apertures extend in a direction slightly slanted with respect to the direction in which the gate line 36 extends. The slanted angle is set in view of the rubbing angle for orientation in a subsequent step.

After the formation of the common electrode 46 (upper electrode), an alignment layer is formed on the common electrode 46 (S22). The alignment layer has the function of aligning liquid crystal molecules in the early stage. For the alignment layer, an organic film, such as polyimide film, is subjected to rubbing. Thus, the element substrate 10 is completed (S24). In addition, the opposing substrate including color filters and an alignment layer is prepared, but not described herein. The opposing substrate and the element substrate 10 are combined together with a liquid crystal layer in between (S26). Thus, the liquid crystal display device is completed (S28).

As described above, the upper electrode or common electrode 46 and the lower electrode or pixel electrode 42 between which the FFS insulating layer 44 is disposed are formed over the planarizing layer 40, on the same optically transparent base 18. This structure may be called overlayer structure. The upper electrode or common electrode 46 is provided with slits 48. A voltage is applied between the lower electrode or pixel electrode 42 and the upper electrode or common electrode 46 to transmit an electric field 50 through the slits 48, thereby generating a transverse electric field mainly parallel to the surface of the substrate. Thus, the transverse electric field drives the liquid crystal layer through the alignment layer. In this structure, the common electrode 46, the pixel electrode 42, and the FFS insulating layer 44 between the electrodes define a capacitor. The capacitor can be used as a storage capacitor of the liquid crystal display device. Thus, an FFS active matrix liquid crystal display device is completed.

By use of the capacitor defined by the common electrode 46 and the pixel electrode 42 with the FFS insulating layer 44 in between as a storage capacitor of the liquid crystal display device, a storage capacitance can easily be obtained according to the specifications of the liquid crystal display device. This is because the dielectric constant, thickness, etc. of the FFS insulating layer 44 can be set independent of the characteristics of the pixel TFT 20, and thus can be set in a wide range. The FFS insulating layer 44 between the common electrode 46 and the pixel electrode 42 can increase the adhesion to other layers or films by setting the residual stress of the FFS insulating layer 44 in a predetermined range. Thus, the resulting liquid crystal display device can display high-quality images.

In the above embodiment, the lower electrode as the pixel electrode and the upper electrode as the common electrode having slits are disposed with the FFS insulating layer in between. Alternatively, a lower electrode may be formed as the common electrode, and an upper electrode is formed as the pixel electrode. This structure will now be described. In the description, the same parts as in FIGS. 1 and 2 are designated by the same reference numerals and their detailed description is omitted.

Figure 5:
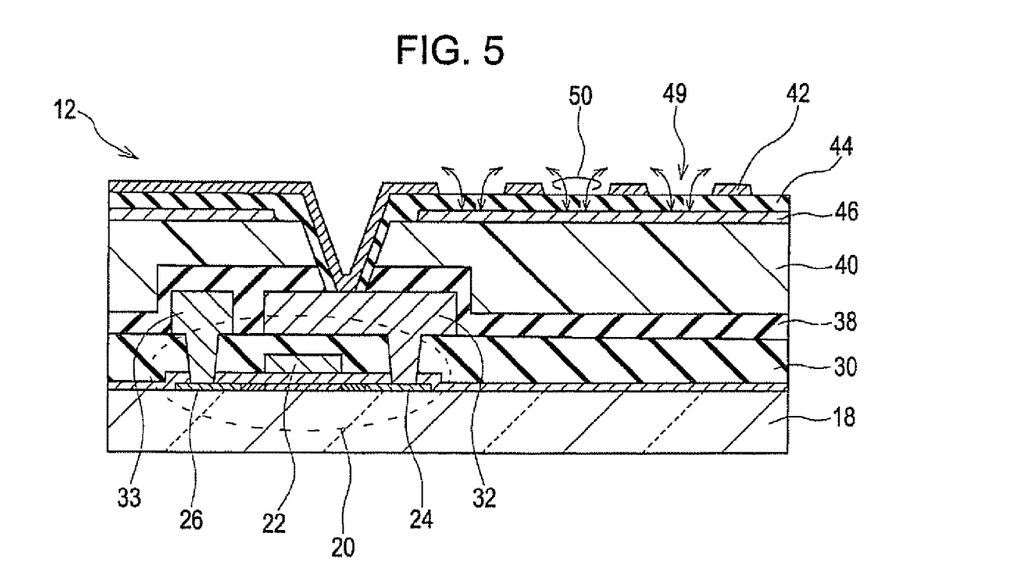
FIG. 5 is a schematic sectional view of another embodiment of the invention.

FIG. 5 is a schematic sectional view of an element substrate 12 including a lower electrode acting as the common electrode 46 and an upper electrode having slits 49 acting as the pixel electrode 42. When the upper electrode is used as the pixel electrode 42, the pixel electrode 42 connected to the source electrode 32 is disposed on the FFS insulating layer 44, as shown in FIG. 5, and is the uppermost layer of the element substrate 12. Slits 49 are formed in the uppermost pixel electrode 42. The slits 49 are closed narrow apertures extending in a direction slightly slanted with respect to the direction in which the gate line 36 extends, as described with reference to FIGS. 1 and 2. The common electrode 46 (lower electrode) is disposed over the entire surface of the element substrate 12 or in such a manner as to cover a plurality of pixels.

A liquid crystal display device including the element substrate 12 having such as structure can be produced by a similar procedure to that shown in FIG. 3, changing the steps corresponding to the steps forming the above structure. The FFS insulating layer 44 is formed so as to have a residual stress in a predetermined range, as described for Step S18 in FIG. 3, thereby increasing the adhesion with the other layers or films. Consequently, the resulting liquid crystal display device can display high quality images. In addition, the FFS insulating layer 44 is formed under conditions that do not degrade the planarizing layer 40 or the common electrode 46 (lower electrode). Thus, the liquid crystal display device can display high-quality images.

In the above embodiments, the pixel TFT has the structure including a semiconductor layer, a gate insulating layer, and a gate electrode in that order in the direction from the optically transparent base to the alignment layer. Alternatively, a so-called inverted staggered type pixel TFT may be used. The inverted staggered type has a structure including a gate electrode, a gate insulating layer, and a semiconductor layer in that order from the optically transparent base to the alignment layer. A structure including an inverted staggered pixel TFT will now be described. In the following description, the same parts as in FIGS. 1 and 2 are designated by the same reference numerals and their detailed description is omitted.

Figure 6:
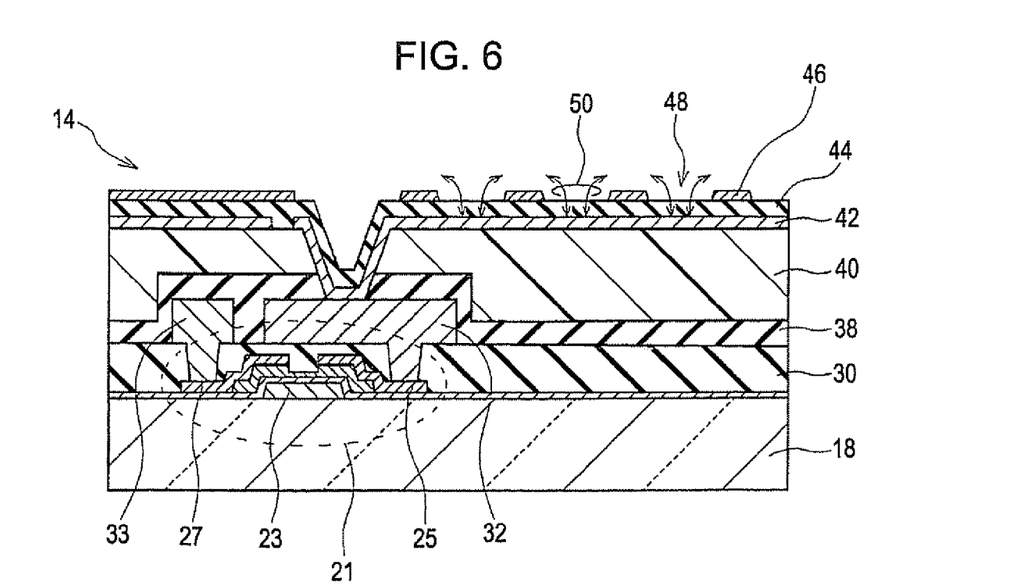
FIG. 6 is a schematic sectional view of still another embodiment of the invention.

FIG. 6 is a schematic sectional view of an element substrate 14 including an inverted staggered pixel TFT 21. For this structure, the gate electrode 23 is first formed on the optically transparent base 18, and subsequently a gate insulating layer is formed on the gate electrode 23. Then, a semiconductor layer is deposited over the gate insulating layer. The semiconductor layer may be made of amorphous silicon. The semiconductor layer includes a channel-forming layer and a highly doped layer for forming a source/drain contact layer. The source electrode 32 and the drain electrode 33 are respectively connected to both ends of the highly doped layer. The element substrate 14 can be produced in the same process as described with reference to FIG. 3, except for the step of forming the pixel TFT 21.

A liquid crystal display device including the element substrate 14 using the inverted staggered pixel TFT can be produced by a similar procedure to that shown in FIG. 3, changing steps for forming the pixel TFT. The FFS insulating layer 44 is formed so as to have a residual stress in a predetermined range, and the steps from forming the planarizing layer 40 to forming the FFS insulating layer are performed under predetermined conditions that do not change the surface states of the planarizing layer 40 or the pixel electrode 42, as described for Step S18 in FIG. 3. Thus, the adhesion between the FFS insulating layer and other layers or films can be increased. Consequently, the resulting liquid crystal display device can display high-quality images. By forming the FFS insulating layer under conditions that do not degrade the planarizing layer 40 or the lower electrode or pixel electrode 42, the liquid crystal display device can display high-quality images.

What is claimed is:

1. A liquid crystal display device comprising:
a pair of substrates opposing each other;
a liquid crystal layer disposed between the pair of substrates; and
a pair of electrodes separated by an insulating layer, disposed on one of the substrates, the pair of electrodes driving the liquid crystal layer, a first one of the electrodes being disposed closer to the liquid crystal layer than a second one of the electrodes and having apertures,
wherein the insulating layer has a compressive stress in the range of 0 to $5 \times 10^4$ N/cm$^2$.

2. The liquid crystal display device according to claim 1, wherein the insulating layer and the pair of electrodes define a storage capacitor.

3. The liquid crystal display device according to claim 1, wherein the insulating layer is made of an inorganic insulating material.

4. The liquid crystal display device according to claim 3, wherein the inorganic insulating material has a refractive index in the range of 1.46 to 2.00 and a dielectric constant in the range of 4 to 7.

5. The liquid crystal display device according to claim 1, wherein the insulating layer includes at least one film selected from the group consisting of a silicon nitride film, a silicon oxide film, and a silicon oxynitride film.

6. The liquid crystal display device according to claim 1, further comprising a transistor on the substrate on which the pair of electrodes is disposed, and a planarizing layer disposed over the transistor, wherein the electrodes separated by the insulating layer are disposed on the planarizing layer.

7. The liquid crystal display device according to claim 1, wherein the second one of the electrodes acts as a pixel electrode and the first one of the electrodes acts as a common electrode.

8. The liquid crystal display device according to claim 7, wherein at least one of the electrodes is made of a transparent electroconductive film.

9. The liquid crystal display device according to claim 1, further comprising a transistor and a planarizing layer in that order on the substrate on which the pair of electrodes are disposed, wherein the electrodes separated by the insulating layer are disposed on the planarizing layer, and the second one of the electrodes is made of a transparent electroconductive film, and wherein the insulating layer is formed under conditions that the planarizing layer and the second one of the electrodes made of the transparent electroconductive film are not degraded.

10. The liquid crystal display device according to claim 9, wherein the insulating layer is made of an inorganic insulating material, and the planarizing layer is made of an organic insulating material.

11. The liquid crystal display device according to claim 9, wherein the insulating layer has a refractive index in the range of 1.46 to 2.00 and a dielectric constant in the range of 4 to 7.

* * * * *